(12) United States Patent
Wang et al.

(10) Patent No.: US 10,392,305 B2
(45) Date of Patent: Aug. 27, 2019

(54) ADDITION OF CARBON DIOXIDE TO CONCRETE MIXTURES

(71) Applicant: The Board of Trustees of the University of Alabama, Tuscaloosa, AL (US)

(72) Inventors: Jialai Wang, Tuscaloosa, AL (US); Xin Qian, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 287 days.

(21) Appl. No.: 15/076,765

(22) Filed: Mar. 22, 2016

(65) Prior Publication Data

US 2016/0280598 A1  Sep. 29, 2016

Related U.S. Application Data

(60) Provisional application No. 62/137,528, filed on Mar. 24, 2015.

(51) Int. Cl.
| | |
|---|---|
| *C04B 14/00* | (2006.01) |
| *C04B 22/10* | (2006.01) |
| *C04B 28/04* | (2006.01) |
| *C04B 7/00* | (2006.01) |
| *C04B 7/34* | (2006.01) |
| *C04B 28/00* | (2006.01) |
| *C04B 32/00* | (2006.01) |
| *C04B 18/06* | (2006.01) |

(52) U.S. Cl.
CPC ............. *C04B 22/10* (2013.01); *C04B 28/04* (2013.01); *Y02W 30/92* (2015.05); *Y02W 30/94* (2015.05); *Y02W 30/95* (2015.05)

(58) Field of Classification Search
USPC ........................................ 106/709, 638, 705
See application file for complete search history.

(56) References Cited

U.S. PATENT DOCUMENTS

| | | | | |
|---|---|---|---|---|
| 2011/0277670 | A1* | 11/2011 | Self | ........................ B01D 61/00 106/638 |
| 2013/0036945 | A1* | 2/2013 | Constantz | ............... C04B 22/10 106/463 |

* cited by examiner

*Primary Examiner* — James E McDonough
(74) *Attorney, Agent, or Firm* — Meunier Carlin & Curfman LLC (57) ABSTRACT

A method for reducing the net amount of carbon dioxide generated in the manufacture of concrete by pre-carbonating calcium rich cementitious materials prior to the addition of ordinary Portland cement is disclosed. Additionally, a composition of concrete is disclosed, which is manufactured by using a mixture of pre-carbonated cementitious materials and ordinary Portland cement.

16 Claims, 4 Drawing Sheets

Step I: Mixing and bubbling in $CO_2$    Step II: Mixing with other ingredients to make concrete

ADDITION OF CARBON DIOXIDE TO CONCRETE MIXTURES

CROSS REFERENCE TO RELATED APPLICATIONS

The present application claims priority to U.S. Provisional Patent Application No. 62/137,528 filed Mar. 24, 2015, which is herein incorporated by reference in its entirety.

STATEMENT REGARDING FEDERALLY SPONSORED RESEARCH

This invention was made with government support under grant number 23006 awarded by the National Science Foundation. The government has certain rights in the invention.

FIELD

The subject matter disclosed herein generally relates to methods comprising the pre-carbonation of concrete. Also, the subject matter described herein generally relates to compositions of concrete comprising a pre-carbonation mixture.

BACKGROUND

Concrete using Ordinary Portland Cement (OPC) as the binder is the most widely used construction material. The global use of concrete is second only to water, accounting for 70% of all building and construction materials. Although OPC has many advantages, such as ease of application and availability of the raw materials around the world, the production of OPC releases a large amount of greenhouse gases, such as carbon dioxide ($CO_2$). One ton of OPC clinker production emits at least 0.9-0.95 tons of $CO_2$, 60% of which is emitted from the calcination process of limestone with the rest coming from the combustion of fuel in kiln. In fact, cement production in the U.S. accounts for up to 7% of the nation's total $CO_2$ emission. Globally, OPC manufacturing creates even greater percentages of $CO_2$ emissions with up to 10% of the total $CO_2$ emissions in some nations. To combat global climate change, the carbon footprint of OPC-based concrete should be reduced. To this end, two strategies can be used: 1) reducing the amount of OPC used in concrete since OPC is the major contributor of the carbon footprint of concrete; and 2) reabsorbing $CO_2$ into concrete.

Reducing the amount of OPC used in concrete can be realized through partially replacing OPC with supplementary cementitious materials (SCMs) or totally replacing OPC with alternative non-OPC binders, which have lower carbon footprint than OPC, including magnesia cement, sulfoaluminate cements, blended OPC-based cements, and geopolymers. Commonly used SCMs, such as fly ash, grounded blast-furnace slag, and cement kiln dust, are calcium-rich industrial wastes. They can hydrate and/or react with hydration products of OPC and thereby enhance the long-term properties of concrete. However, these reactive SCMs can also create new problems in concrete with respect to retardation, delayed setting time, and low early-age strength.

Non-reactive SCMs, especially ground limestone (mainly consisting of calcite ($CaCO_3$)) are also used to partially replace OPC. Due to the additional surface area provided by the limestone powders for the nucleation and growth of the hydration products, a slight acceleration of the hydration of OPC has been observed with the addition of $CaCO_3$. In addition, $CaCO_3$ can be reactive. It can have limited reactivity with the aluminate phases of OPC. Thermodynamic simulation and experimental studies show that the $CaCO_3$ can alter the hydration products and stabilize ettringite, leading to an increase in the total volume of the hydrate phase, which can reduce the porosity of hardened concrete. Therefore, limited replacement (less than 10%) of OPC by limestone can have some impact on the short and long term performance of concrete. Since some reactive SCMs, such as fly ash, contain an aluminate phase, they can be used together with limestone powders to form blended SCMs. A successful application of such blended SCMs is ternary cement in which blended SCMs consisting of fly ash and limestone can be used to partially replace OPC. Due to the synergistic effect induced by the limited reaction between the limestone powders and aluminate phase in reactive SCMs, the ternary cement using blended SCMs works better than the binder using individual SCMs. However, the use of limestone powder is limited to low replacement levels. At higher replacement levels (more than 10-15% of OPC), most of the limestone is non-reactive and the strength of concrete is reduced due to the dilution effect of the limestone powder. Thus, replacement of OPC with an SCM typically results in some reduction in the strength or the durability of the manufactured concrete.

A second possible way to reduce the carbon footprint in concrete manufacturing is to reabsorb the emitted $CO_2$. $CO_2$ emitted during manufacturing of OPC can be naturally reabsorbed in concrete products through a natural chemical reaction. However, the natural process is relatively slow and it can take hundreds of years to reabsorb all the $CO_2$ during the production of an equivalent amount of concrete. In addition, carbonation is detrimental to concrete because it can cause corrosion of the steel reinforcement present in many concrete applications. However, carbonating concrete at an early age and high concentration and pressure of $CO_2$ can significantly accelerate the strength development of concrete, as shown in some studies. Here, early age concrete specimens are cured in a closed chamber full of $CO_2$ gas. After diffusing into the concrete specimen, $CO_2$ gas can react with fresh concrete and transform into solid calcium carbonates ($CaCO_3$) stored permanently in concrete. Reabsorbing $CO_2$ in concrete is an example of a general concept of storing $CO_2$ permanently in the form of thermodynamically stable carbonates through chemical reaction between $CO_2$ and reactive metal oxides. In addition to cement and concrete, numerous other minerals and industrial wastes have been evaluated to store $CO_2$.

Although using high concentrations and pressures of $CO_2$ can increase the speed of the carbonation, the reaction rate of carbonation can be the major obstacle of this technique. This is because the carbonation reaction rate of early age concrete can be limited by the diffusion of the gaseous $CO_2$ into the concrete matrix, which can be very slow. In addition, the carbonation products, $CaCO_3$ particles, can fill the pores in concrete matrix so that the diffusion of $CO_2$ becomes more difficult as the carbonation reaction progresses. Therefore, existing studies on carbonation curing of concrete are limited to concrete specimens with a small thickness so that diffusion of $CO_2$ to the full depth of the specimen is possible in short period. In addition, the degree of carbonation varies at different depths from the surface and thereby affects the properties of concrete. Excessive carbon curing can destroy calcium silicate hydrate (CSH), the major hydration product and binding agent of OPC, and thereby reduce the strength of concrete. Consequently, the theoretical $CO_2$ absorption of concrete can never be reached if the strength of concrete must be maintained. Also, since a closed curing chamber is needed, carbonation curing technology is usually applicable to only precast concrete.

What are thus needed are new methods and compositions for reducing the carbon footprint associated with concrete manufacture. Such compositions and methods should also permit the strength and durability of the concrete to be maintained, while eliminating the difficulties encountered in existing approaches. The compositions and methods disclosed herein address these and other needs.

SUMMARY

In accordance with the purposes of the disclosed materials, compounds, compositions, and methods, as embodied and broadly described herein, the disclosed subject matter, in one aspect, relates to compounds and compositions and methods for preparing and using such compounds and compositions. In further aspects, the disclosed methods comprise the addition of $CO_2$ to slurries of calcium-rich SCMs. The disclosed methods can further comprise the addition of the remaining ingredients of concrete to the carbonated slurry to manufacture concrete. Carbonated calcium-rich cementitious material powders and slurries are also described herein.

In some examples, the calcium-rich cementitious material can be carbonated before the addition of water. The resulting carbonated slurry can be used to manufacture concrete through the addition of the remaining ingredients of concrete, such as OPC and aggregates.

By pre-carbonating calcium-rich cementitious material either as a neat powder or as a slurry in water, concrete can be manufactured with a lower net $CO_2$ release by entrapping some $CO_2$ in the produced concrete. Here, the concrete can be produced without sacrificing the strength or the thickness by replacing up to 70% of OPC with pre-carbonated cementitious materials, such as fly ash. Thus, concrete having up to 70% carbonated calcium-rich cementitious material are also described herein.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

DETAILED DESCRIPTION

The materials, compounds, compositions, articles, and methods described herein may be understood more readily by reference to the following detailed description of specific aspects of the disclosed subject matter and the Examples included therein.

Before the present materials, compounds, compositions, kits, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

By "reduce" or other forms of the word, such as "reducing" or "reduction," is meant lowering of an event or characteristic (e.g., released volatiles in produced). It is understood that this is typically in relation to some standard or expected value, in other words it is relative, but that it is not always necessary for the standard or relative value to be referred to. For example, "reduces $CO_2$" means reducing the amount of $CO_2$ produced relative to a standard or a control, such as the production of cement without the pretreatment of $CO_2$. As used herein, reduce can include complete removal. In the disclosed method, reduction can refer to a 10%, 20%, 30%, 40%, 50%, 60%, 70%, 80%, 90%, or 100% decrease as compared to the standard or a control. It is understood that the terms "sequester," "capture," "remove," and "separation" are used synonymously with the term "reduce."

By "contact" or other forms of the word, such as "contacted" or "contacting," is meant to add, combine, or mix two or more compounds, compositions, or materials under appropriate conditions to produce a desired product or effect (e.g., to reduce or eliminate a particular characteristic or event such as $CO_2$ reduction). The term "react" is sometimes used when "contacting" results in a chemical reaction.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

A calcium-rich cementitious material is meant to refer to a compound that has at least 1% of calcium by weight, which upon contact with water forms concrete. Some examples of calcium-rich cementitious materials include slaked lime, fly ash, metakaolin, cement kiln dust, blended ordinary Portland cement-based cements, ground granulated blast-furnace slag, limestone fines, or any combinations of multiple calcium-rich cementitious materials.

A carbon dioxide-rich gas is meant to refer to a gas that has at least 1 mol % of carbon dioxide. Some examples of a carbon-dioxide gas include pure carbon dioxide or post-combustion flue gas. Atmospheric air is not included within the definition of a carbon dioxide-rich gas.

Reference will now be made in detail to specific aspects of the disclosed materials, compounds, compositions, articles, and methods, examples of which are illustrated in the accompanying Examples.

Materials and Compositions

Disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of components A, B, and C are disclosed as well as a class of components D, E, and F and an example of a combination composition A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

Figure 1:
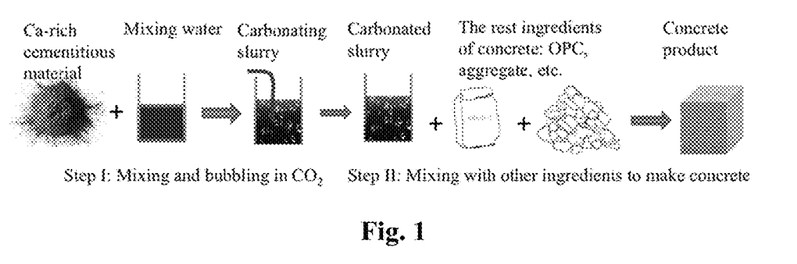
FIG. 1 is a schematic that illustrates a two-step mixing approach for adding $CO_2$ in concrete.

In the methods and compositions disclosed herein carbon dioxide ($CO_2$) can be incorporated as an admixture for concrete manufacturing before OPC is added (see e.g., pre-carbonation, FIG. 1). The disclosed methods and compositions can alleviate the challenge of carbonating OPC by first dissolving $CO_2$ into a slurry of calcium-rich cementitious material, which can enhance the rate of $CO_2$ uptake. Since $CO_2$ is in the gas phase in ambient environments, it can be difficult to directly mix $CO_2$ with the other ingredients of concrete to make concrete products. However, absorbents can be used to absorb $CO_2$ first before mixing with the other ingredients to make concrete. Since the cementitious materials used in the concrete—both OPC and commonly used SCMs including high calcium fly ash, blast-furnace slag, cement kiln dust, and slaked lime—are rich in calcium, $CO_2$ can be absorbed by these materials through reaction with calcium to produce a mixture of calcium carbonate/bicarbonate. Therefore, these calcium-rich cementitious materials can serve as $CO_2$ absorbents and no extra absorbent is needed. Two alternative methods can be used to pre-carbonate cement, which can result in a net reduction in the release of $CO_2$ during the manufacture of cement: a wet method and a dry method.

Wet Method

An example of the wet method is illustrated in FIG. 1.

In a first step, calcium-rich cementitious material can be mixed with water to form a slurry. Then, $CO_2$ can be added to the slurry. The $CO_2$ can be added through a gas bubbler, dissolution, adsorption, absorption or a mixture of thereof. Carbon dioxide dissolved in the slurry can react with calcium ions in the slurry to form a mixture of calcium carbonate and calcium bicarbonate. The $CO_2$ can be stored in the calcium carbonate and calcium bicarbonate compounds.

In a later step, other ingredients of the concrete, including OPC, aggregates, and other admixtures, as needed depending on the particular application, can be added and mixed with the slurry produced in the first step to produce concrete.

The calcium-rich cementitious material can be OPC or an SCM including slaked lime, fly ash, metakaolin, cement kiln dust, blended ordinary Portland cement-based cements, ground granulated blast-furnace slag, limestone fines, or any combination thereof.

Aggregates and other admixtures can be added as fillers or to concrete mixtures to modify the hardened concrete, such as the workability or compressive strength. Aggregates may be added to concrete mixtures to influence the hardness or the workability of the concrete. Some examples of aggregates are sand, gravel, or crushed stone. Admixtures may be added to concrete mixtures to improve stability or to ensure the quality of concrete during mixing, transporting, placing, and curing. Some examples of admixtures include pigments or chemical admixtures.

Mixing in the wet method can be a carbonation process in which the calcium-rich cementitious material is carbonated by $CO_2$. Since this carbonation occurs before the casting of concrete, it can be referred to as the pre-carbonation method. Accordingly, the carbonation during the curing of concrete approach can be referred to as the post-carbonation method since carbonation is carried out after the casting of the concrete. Pre-carbonation may reduce the workability of the slurry in similar way as the false set of OPC due to the precipitation of calcium carbonate. However, this problem can be overcome by applying vigorous mixing, which can break down the aggregation of the calcium carbonate particles. Since $CO_2$ can be directly bubbled into the slurry in the pre-carbonation method, the slow diffusion process through concrete matrix is eliminated, and thereby the pre-carbonation method overcomes the major drawback of the post-carbonation and can be used to make bulky and large-size concrete products. Since no closed curing chamber is needed, pre-carbonation is applicable to the in situ casting of concrete products with arbitrary shapes and sizes. In addition, the effect between $CaCO_3$ and aluminate can still be utilized by adding limestone powders in the pre-carbonation method since $CaCO_3$ can be generated during the pre-carbonation process.

Dry Method

In a first step of the dry method, calcium-rich cementitious material can be pre-carbonated as a dry powder by adding $CO_2$. The $CO_2$ can be added through a gas bubbler, adsorption, absorption, or a mixture thereof.

In a later step, the pre-carbonated calcium-rich cementitious material can then be added to water to generate a slurry.

In a still later step, other ingredients of the concrete, including OPC, aggregates, and other admixtures, as needed depending on the particular application, are added and mixed with the slurry to produce concrete.

Aggregates and other admixtures can be added as fillers or to concrete mixtures to modify the hardened concrete, such as the workability or compressive strength. Aggregates may be added to concrete mixtures to influence the hardness or the workability of the concrete. Some examples of aggregates are sand, gravel, or crushed stone. Admixtures may be added to concrete mixtures to improve stability or to ensure the quality of concrete during mixing, transporting, placing, and curing. Some examples of admixtures include pigments or chemical admixtures.

Again, since no closed curing chamber is needed, pre-carbonation is applicable to the in situ casting of concrete products with arbitrary shapes and sizes. In addition, the effect between $CaCO_3$ and aluminate can still be utilized by adding limestone powders in the pre-carbonation method since $CaCO_3$ can be generated during the pre-carbonation process.

The calcium-rich cementitious material can be OPC or an SCM including slaked lime, fly ash, metakaolin, magnesia cement, sulfoaluminate cements, blended OPC-based cements, geopolymers, ground granulated blast-furnace slag (GGBS), limestone fines and silica fume.

Wet or Dry Methods

Pre-carbonation by either method can enhance the strength and durability of the produced concrete due to several mechanisms activated by the pre-carbonation method. Structures constructed by this concrete either can consume less OPC or can have longer service-life, leading to a more sustainable infrastructure system.

Pre-carbonation can have many advantages over using limestone powder in concrete. By exploiting the phase transformation of $CaCO_3$, the new method can make use of the binding capacity of $CaCO_3$ to produce a novel calcium silicate hydrate (CSH)—$CaCO_3$ hybrid binder. Thus, the dilution effect associated with use of limestone powders can be reduced. Because both amorphous calcium carbonate (ACC) and vaterite can have much higher solubility than calcite in the pore water, the carbonate produced in pre-carbonation can be more active and quicker to react with aluminate than limestone powders.

Pre-carbonation can introduce less carbonate into concrete than adding limestone powders, and therefore, reduces the risk of formation of thaumasite at low temperature under sulfate attack. Nanoparticles can be produced in situ in the pre-carbonation method. The cost of grinding and dispersing of limestone nanoparticles is eliminated.

Pre-carbonation can also promote the more effective application of mineral fillers in concrete to replace OPC, especially for non-reactive mineral fillers. Currently, non-reactive mineral fillers used to replace OPC contain mainly limestone powder due to its synergistic effects with OPC and SCMs. However, pre-carbonation can also possess all of these synergistic effects. Therefore, other non-reactive mineral fillers such as quartz powder can be used together with the pre-carbonation technique to achieve the same or even better results as limestone powder. Utilization of more mineral fillers in construction materials can lead to many environmental benefits, such as conserving landfill space, reducing the depletion of natural resources, reducing energy consumption, and reducing $CO_2$ emissions.

Pre-carbonation can make the use of $CO_2$ beneficial, which can reduce the carbon footprint of concrete. Either pure $CO_2$ or post-combustion waste flue gas can be used as the source of $CO_2$ to reduce the cost.

2 inch×4 inch concrete (mortar) cylinder specimens can be made using SAKRETE™ type I/II Portland cement, water, and standard graded fine aggregate at mass ratio of 920:500:2520. Three possible applications of the disclosed methods and compositions were considered in the testing: 1) application with only OPC or non-reactive mineral fillers; 2) application with calcium rich SCMs such as high calcium fly ash; and 3) application with low or non-calcium SCMs such as metakaolin. In the first application, slaked lime was used to replace 1% of OPC. The slaked lime slurry was first carbonated and then mixed with other ingredients to make cylinder specimens. To demonstrate pre-carbonation, a group of specimens were also made using 1% slaked lime without pre-carbonation to replace OPC. Another group of specimens were made with 1% limestone powder to replace OPC to show the advantages of the pre-carbonation method over the method of directly adding limestone powders. In the second application, a control group of specimens were made with 20% of OPC replaced by high calcium fly ash. To make the pre-carbonated group, the high calcium fly ash slurry was quickly carbonated and then mixed with other ingredients to make specimens. In the third application, the control group was made with 20% OPC replaced by metakaolin. Since calcium content is very low in metakaolin, 1% (of OPC) slaked lime slurry was first carbonated and then mixed with metakaolin, OPC, and other ingredients to make the processed group.

Figure 2:
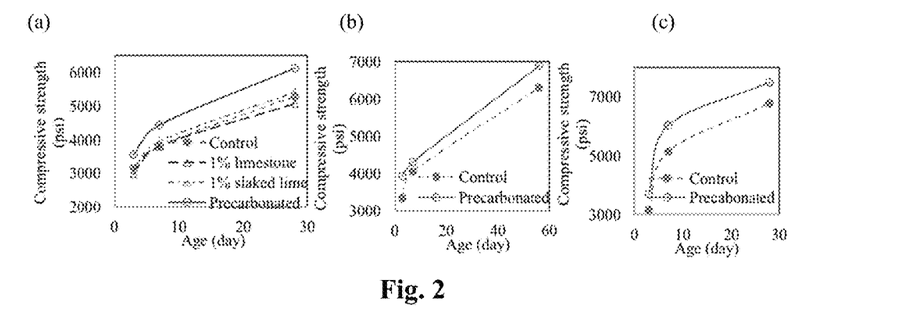
FIG. 2 is a group of three graphs demonstrating the strength enhancement observed in concrete by pre-carbonation: Panel (a) is a graph of compressed strength over time of concrete with 1% replacement limestone, 1% replacement with slaked lime, or precarbonation treatment; Panel (b) is a graph of compressed strength over time of concrete with a 20% replacement with fly ash with and without precarbonation treatment; Panel (c) is a graph of compressed strength over time of concrete with 20% replacement with metakaolin with and without precarbonation treatment.

The compressive strengths of these 2"×4" cylindrical specimens were measured at different ages and are presented in FIG. 2. Compared with the control group, adding pre-carbonated slaked lime can enhance the compressive strengths of the mortar at ages of 3, 7, and 28 days by 13%, 16%, and 16%, respectively. If only 1% OPC is replaced by slaked lime and no pre-carbonation processing is used, no significant increase of the compressive strength of the mortar can be induced (FIG. 2(a)), indicating that pre-carbonation can enhance the strength of the mortar. While replacing 1% of OPC with limestone powder can reduce the strength of the mortar, as shown in FIG. 2, Panel (a). FIG. 2, Panel (b) shows that pre-carbonation can increase the compressive strength of the mortar made with 20% OPC replaced by high calcium fly ash at ages of 3, 7 and 56 days by 18%, 6%, and 10%, respectively. Similarly, pre-carbonation can improve the compressive strength of the mortar with 20% of OPC replaced by metakaolin at ages of 3, 7, and 28 days by 17%, 17%, and 11%, respectively, as shown in FIG. 2, Panel (c). Thus, the pre-carbonation method can significantly enhance the strength of the mortar. If optimal pre-carbonation parameters are used, more improvement on strength can be achieved.

Adding ground limestone can slightly accelerate the hydration of OPC due to the additional surface area provided by limestone powder for the nucleation and growth of the hydration products of OPC. The hydration rate of OPC can be significantly increased if limestone nanoparticles are used. However, it is difficult to disperse nanoparticles into concrete because of their small size. If the pre-carbonation method is used, $CO_2$ gas is first dissolved in water forming carbonic acid (Eq. (1)). Then carbonic acid dissociates to $H^+$ and $CO_3^{2-}$ (Eq. (2)). With the help of $H^+$ ions, $Ca^{2+}$ in the slaked lime or SCMs are released, which can meet with $CO_3^{2-}$ to form calcium carbonate precipitants, which usually are particles in micrometers, as shown in Eq. (3). If more $CO_2$ is bubbled into the slurry, some of calcium carbonate can be dissolved to form calcium bicarbonate, which has much higher solubility in water, as shown in Eq. (4).

$$CO_{2(aq)} + H_2O_{(l)} \leftrightarrow H_2CO_{3(aq)} \tag{1}$$

$$H_2CO_{3(aq)} \leftrightarrow H^+_{(aq)} + HCO_3^-_{(aq)} \leftrightarrow H^+_{(aq)} + CO_3^{2-}_{(aq)} \tag{2}$$

$$Ca^{2+}_{(aq)} + CO_3^{2-}_{(aq)} \rightarrow CaCO_{3(s)} \tag{3}$$

$$CaCO_{3(s)} + H_2O_{(l)} + CO_{2(aq)} \leftrightarrow Ca^{2+}_{(aq)} + HCO_3^-_{(aq)} \tag{4}$$

Figure 3:
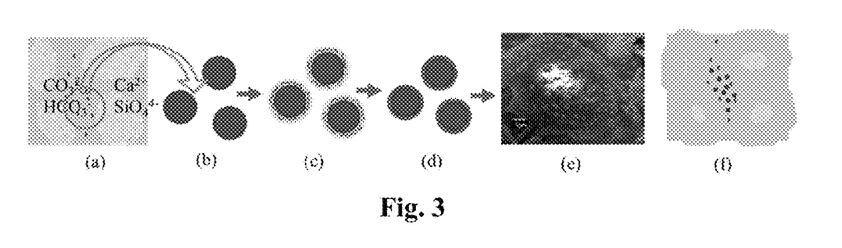
FIG. 3 is an illustration that displays a possible mechanism of in situ production of nanoparticles. In the basic environment of the fresh concrete (Panel (a)), growing $CaCO_3$ nanoparticles generate a pH gradient over their surfaces due to dissociation of bicarbonate ions (Panel (b)). Silicate species respond to these local changes by polymerization reactions which prompt in-situ precipitation of silica skins around the particles (Panels (c) and (d)). SEM images show the produced nanoparticles in concrete (Panel (e)); In-situ nanoparticles and their seeding effect to increase the density of the microstructure of hardened concrete (Panel (f)).
Figure 4:
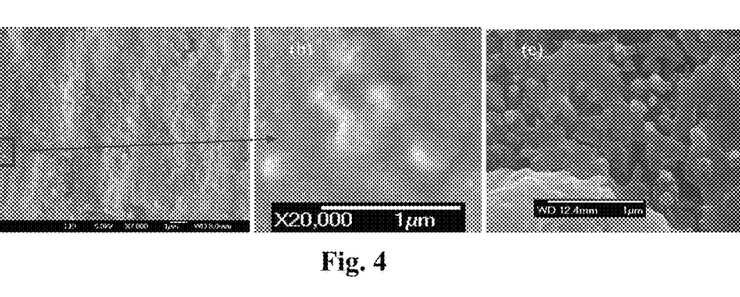
FIG. 4 are images showing nanoparticles of calcium carbonate produced by pre-carbonation. Panel (a) is the SEM image of a precarbonated mortar specimen; Panel (b) is the close-up of Panel (a) showing $CaCO_3$ nanoparticles with silica skin; Panel (c) shows calcite particles having sizes of about 100 nm exposed after polishing the mortar sample which are produced in-situ in the mortar by the proposed method.

Therefore, after pre-carbonation, the slurry of slaked lime or calcium-rich SCM can be rich in $Ca^{2+}$, $HCO_3^-$, and a small portion of $CO_3^{2+}$, as shown in FIG. 4, Panel (a) and FIG. 3, Panel (a). After mixing with OPC, $Ca(OH)_2$ is released into water and reacts with $HCO_3^-$, which can produce $CaCO_3$ precipitates, as in Eq. (5).

$$Ca(OH)_{2(aq)} + HCO_3^-_{(aq)} \rightarrow CaCO_{3(s)} + H_2O_{(l)} \tag{5}$$

Growing calcium carbonate nanoparticles produced in Eq. (5) in alkaline solution of concrete can generate pH gradients over the surfaces due to dissociation of bicarbonate ions. Silicate species (FIG. 3, (Panels (b-d)) dissolved from cement particles can respond to these local changes by undergoing polymerization reactions which can prompt the in situ precipitation of silica skins around the particles as shown in FIG. 3, (Panels (b-d)). A high concentration of silica in fresh concrete can stabilize these calcium carbonate nanoparticles from aggregation. Due to the high affinity of this silica skin with calcium silicate hydrate (CSH), these calcium carbonate-silica nanoparticles can be ideal nucleation sites for the precipitation of CSH out of the pore solution. FIG. 3 (Panel (e)), shows such nanoparticles found by scanning electron microscopy (SEM) in the pre-carbonated mortar sample after 5 days of hydration. It can be seen that most particles are around 100 nm. Energy-dispersive x-Ray spectroscopy (EDX) element mapping on these particles shows that the major element is Si and no C can be detected, suggesting that these particles are truly covered by a silica skin. These nanoparticles and CSH precipitated on them fill the gap between cement particles. As a result, capillary porosity of the mortar can be reduced (FIG. 3, (Panel (f)), which can lead to a denser microstructure and higher compressive strengths (FIG. 2).

FIG. 4 shows the representative microstructure of the pre-carbonated mortar specimen. It can be seen that the pre-carbonated specimen has a dense microstructure (FIG. 4, Panel (a)). Spherical hydrated products covered by mineral precipitants can be identified. FIG. 4, Panel (b) show a close-up of these spherical hydration products having sizes of a few hundred nanometers, which were not found on the mortar without pre-carbonation. Without wishing to be bound by theory, these spherical particles may have resulted from the seeding effect of spherical $CaCO_3$-silica nanoparticles. After polishing the surface of the mortar sample, small particles having sizes of about 100 nm were exposed in the gap of cement particles, as shown in FIG. 4, Panel (c). These particles have a trigonal-rhombohedral shape, which is typical for calcite crystal. Element analysis showed that only calcium and oxygen exist at these particles, suggesting that these particles are nano calcite.

Figure 5:
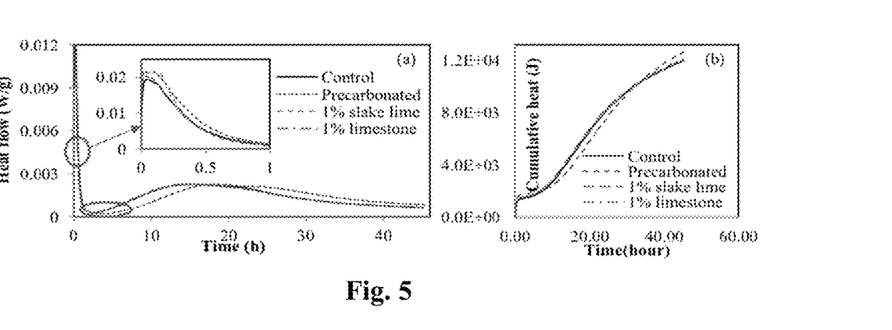
FIG. 5 is a pair of isothermal calorimetry curves of cement pastes. Panel (a) shows heat flow and Panel (b) shows accumulative heat.

In situ production of nanoparticles in pre-carbonation technique can also be observed from isothermal calorimetry curves shown in FIG. 5, (Panel (a). The close-up of the curves in the first hour of hydration (FIG. 5, Panel (a)) shows that the pre-carbonated sample can have a higher heat flow than other three samples, suggesting that nanoparticles can be produced in this period. Because the formation of calcium carbonate can consume more $Ca^{2+}$ and $OH^-$ in the fresh concrete, pre-carbonated sample can have a longer dormant period than other samples, as shown in FIG. 5, Panel (a). Since the nanoparticles can form between cement particles, the longer dormant period might not lead to a longer setting time or lower early age strength. The initial and final setting times of the pre-carbonated sample are 126 and 185 min, respectively; while the corresponding setting time of the control group are 135 and 201 min, respectively. It can be seen that pre-carbonation can slightly reduce the setting time. As shown in FIG. 2, this longer dormant period can have no negative effect on the strength development of the concrete. The early age strength of pre-carbonated specimens measured at 3 and 7 days all show significant improvement. FIG. 5, Panel (b), shows that after overcoming the deficit of the longer dormant period due to in situ production of nanoparticles, the accumulative energy released from the pre-carbonated sample exceeds other samples, suggesting that pre-carbonation can promote the hydration of the cement, which also contributes to higher strength of the processed mortars.

Compared with adding calcium nanoparticles, in situ production of nanoparticles has many advantages. It reduces the manufacturing cost of nanoparticles, and the difficult task of dispersing nanoparticles in cement slurry can be also eliminated. In addition, the produced calcium carbonate-silica composite nanoparticles can provide better nucleating sites for CSH due to the higher affinity of the produced particles with CSH.

The addition of alkaline materials can increase the early strength of the produced concrete, but can result in the reduction of strength at 28 days due to lowering of the gel in the presence of alkaline materials. The shrinkage of concrete tends to increase with content of alkaline materials in cements. More reticular and more porous cement paste can be observed in high alkali cement than in low alkali paste.

Calcium carbonate/bicarbonate produced during pre-carbonation can buffer the alkalinity of the slaked lime or calcium-rich SCMs, and could lead to a denser microstructure, as shown in FIG. 4. A recent study suggested that pre-carbonation could increase CSH gel in concrete. However, with bacteria treatment, the activity of the bacteria can generate $CO_2$, which can turn free lime in CKD into $CaCO_3$ and could reduce the alkalinity of CKD. As a result, more CSH gel has been found in the concrete, which can lead to a significant increase in compressive strength.

One challenge to using limestone powder in the production of concrete is its potentially low reactivity. Except the limited reaction with aluminate, limestone powder containing mainly calcite can be used as a filler instead of as a binder. Thus, the addition of too much limestone powder can reduce the strength of concrete.

Figure 6:
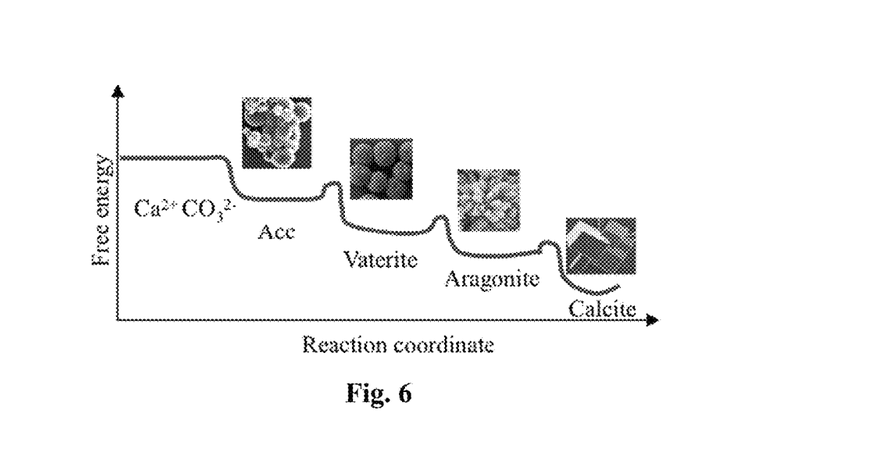
FIG. 6 demonstrates the calcium carbonate phase transformation.
Figure 7:
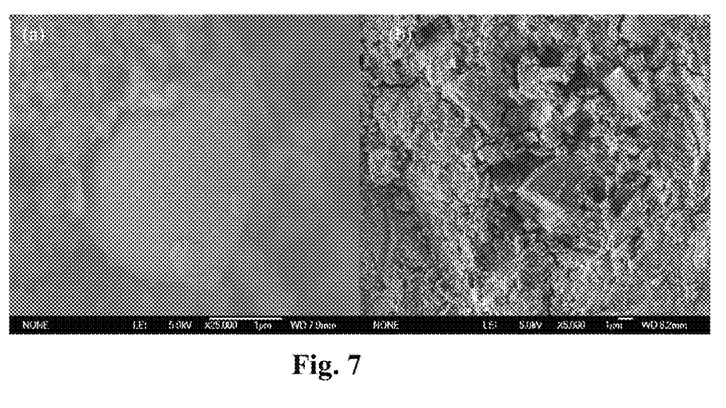
FIG. 7 are images showing the phase change of calcium carbonate in the pre-carbonated mortar samples. Panel (a) shows a vaterite found in the mortar sample, and Panel (b) shows the calcite found in the mortar sample.

$CaCO_3$ has several different schemes of atomic arrangements or polymorphs, which are vaterite, aragonite, and calcite. At room temperature and pressure, vaterite and aragonite are metastable and only calcite is thermodynamically stable; therefore, calcite can form predominantly. In the pre-carbonation method, amorphous calcium carbonate (ACC) may initially precipitate from solution when $CO_2$ is bubbled into the slurry. Then, ACC can transform into one or more of its three polymorphs in the following order: ACC to vaterite, aragonite, and calcite (where intermediate phases may or may not be present as shown in FIG. 6). The phase transformation of $CaCO_3$ is completed through a dissolving-recrystallization process, in which unstable ACC or vaterite dissolves, which can release calcium and carbonate into solution. Then, the calcium carbonate can re-precipitate on the surface of the growing calcite crystals. Due to this phase transformation process, ACC and metastable $CaCO_3$ can be used as a binder to cement, which can result in aggregation of the cementitious materials. In the pre-carbonation method, $CaCO_3$ can be produced in a similar precipitation process. Since the pre-carbonation can take less than 15 min, most of the produced $CaCO_3$ can be in the ACC or vaterite phase. After mixing with other ingredients of the concrete, the precipitated $CaCO_3$ can dissolve and re-crystalize as calcite. In this way, $CaCO_3$ can also function as a binder and a novel CSH-$CaCO_3$ hybrid binder can be produced, which may have higher mechanical strength and many other superior properties. Such a phase transformation process of $CaCO_3$ in pre-carbonated concrete is shown in FIG. 7. In FIG. 7, $CaCO_3$ particles in two phases were found in the pre-carbonated mortar samples at the age of 3 days. FIG. 7, Panel (a) shows a spherical $CaCO_3$ particle which consists of numerous nanoparticles, which is a vaterite particle. The $CaCO_3$ particles shown in FIG. 7, Panel (b) have already transformed into calcite. In such a case, the pre-carbonation method can reduce or eliminate the dilution effect associated with adding limestone powders, which mainly are calcite.

In OPC, gypsum ($CaSO_4.2H_2O$) can be used as a set retarder through its reaction with anhydrous calcium aluminate $C_3A$ during cement hydration to form ettringite. Ettringite formed in the above equation might not be stable and can react further with $C_3A$ to generate monosulfate (Eq. (7)).

$$C_3A + CaSO_4.2H_2O + H_2O \rightarrow C_3A.3CaSO_4.32H_2O \text{ (ettringite)} \quad (6)$$

$$C_3A + C_3A.3CaSO_4.32H_2O + H_2O \rightarrow C_3A.3CaSO_4.14H_2O) \text{ (monosulfate)} \quad (7)$$

Figure 8:
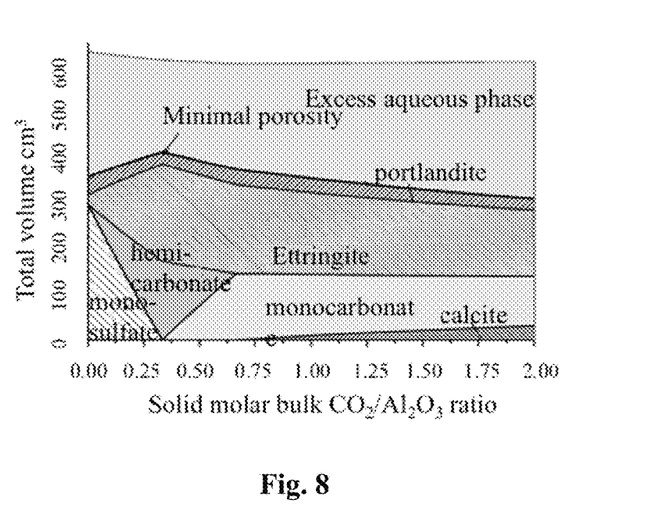
FIG. 8 shows the specific volume changes of hydrate phases with fixed sulfate ratio ($SO_3/Al_2O_3=1$) in dependence of changing carbonate contents ($CO_2/Al_2O_3$) at 25° C.

Adding $CO_2$ into concrete through pre-carbonation can modify the hydration of $C_3A$. The final reaction products are mainly determined by the molar ratio of $CO_2/Al_2O_3$ and $C_3A/SO_3$, as shown by thermodynamic simulation (FIG. 8). For example, if the molar $C_3A/SO_3$ ratio of the cement is near one, the hydration of $C_3A$ can be modified by the addition of $CO_2$ as in Eq. (8).

$$C_3A + CaSO_4 + Ca(OH)_2 + CO_2 + H_2O \rightarrow C_3A.3CaSO_4.32H_2O + 2C_3A.0.5CaCO_3.0.5Ca(OH)_2.11.5H_2O \text{ (hemicarbonate)} \quad (8)$$

If more $CO_2$ is added, the hemicarbonate in Eq. (8) can be partially or completely replaced by monocarbonate, as shown in FIG. 8. Eq. (8) suggests that adding $CO_2$ to concrete can change the mineralogy of the hydrated cement, since: 1) more ettringite can be produced and stabilized, 2) more monocarbonate can be produced, and 3) monosulfate can be reduced or eliminated. All three changes can raise the strength and durability of concrete. Formation of ettringite can produce more solid products and can reduce the porosity of the hydrated concrete due to the large volume expansion of the ettringite. This can be seen from the thermodynamic simulation shown in FIG. 8, in which the total volume of minerals increases with the formation of ettringite can be induced by the addition of $CO_2$ until a maximum is reached. Bulk modulus of monocarbonate (54 GPa) is significantly higher than any other hydration products. Therefore, producing more monocarbonate may also increase the strength and stiffness of the concrete. Reducing or eliminating monosulfate in concrete can increase the durability of the concrete because monosulfate can later be transformed into ettringite on exposure to high humidity and/or $CO_2$. This can cause expansion and microcracking in the matrix and generate a gap around the aggregate (delayed ettringite formation (DEF)) as in Eq. (9)-(10).

$$C_3A.3CaSO_4.14H_2O+CaSO_4.2H_2O+H_2O \rightarrow C_3A.3CaSO_4.32H_2O \text{ (ettringite)} \quad (9)$$

$$C_3A.3CaSO_4.14H_2O+Ca(OH)_2+CO_2+H_2O \rightarrow C_3A.3CaSO_4.32H_2O+2C_3A.0.5CaCO_3.0.5Ca(OH)_2.11.5H_2O \quad (10)$$

Figure 9:
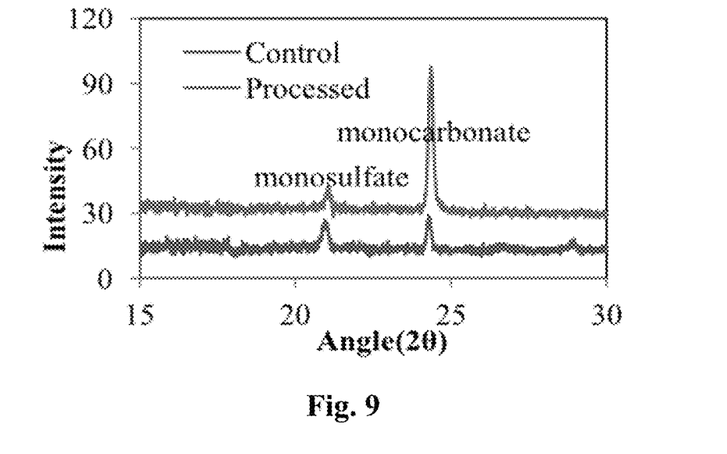
FIG. 9 demonstrates the differences of the solid content via XRD of a control sample and one that was pre-carbonated.

This can be supported by the X-ray diffraction (XRD) results of the control and pre-carbonated mortar measured at age of 56 days. As shown in FIG. 9, the pre-carbonated sample can have a lower monosulfate content, but a higher monocarbonate content. Due to the angle range used in the test, ettringite with major peaks near 10 degree was not detected in this testing.

FIG. 8 shows that the reaction between $CO_2$ and $C_3A$ can be limited, with an upper limit of 0.66 for the carbonate ratio in the particular case considered in the figure. Above this limit, limestone powder will only function as a filler, diluting the binding effect of OPC. However, in pre-carbonated concrete, $CaCO_3$ above this limit still experiences phase transformation and eventually contributes to the strength of the concrete.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1: Effect of Carbonation on the Strength of Concrete

In this example, OPC from manufacturer A (OPC A) was used as the binder in concrete manufacturing. Concrete was manufactured with three different processes. In the first manufacturing process, Control Sample, OPC A was the only cementitious material used. Table 1 provides the relative ratios of the components in the manufacture of concrete in Sample 1-A. The second manufacturing process, named Sample 1-B, uses the same components as Sample 1-A, but a 1% portion of slaked lime ($Ca(OH)_2$) was added to the mixing water. The third composition has the same components as Sample 1-B, which included the additional portion of slaked lime, but was additionally subjected to carbonation through the bubbling of $CO_2$, as seen in Table 2. The three concrete mixtures were cast into 2 inch×4 inch cylinder specimens. The compressive strengths of the 2 inch×4 inch cylinder specimens were measured at three different ages and are shown in Table 2. The strengths shown in Table 2 are average values of three replicated specimens. From Table 2, it can be seen that by only adding 1% of slaked lime in the concrete manufacturing process, the compressive strength of the resulting concrete can be improved only slightly (2.3% increase after 28 days). However, the carbonated sample led to a 13%, 16%, and 16% increase in compressive strength at 3, 7, and 28 days, respectively. Thus, $CO_2$ addition can significantly enhance the strength of the concrete, which does not diminish with time.

TABLE 1

Components of Sample 1-A

| Ingredient | Cement (OPC A) | Water | Sand | Total |
| --- | --- | --- | --- | --- |
| Mass (g) | 1380 | 750 | 3780 | 5910 |
| Percentage (%) | 23 | 13 | 64 | 100 |

TABLE 2

Compressive Strength of Concrete using OPC A

| Age | 3 days Strength (psi) | 7 days Strength (psi) | 28 days Strength (psi) |
| --- | --- | --- | --- |
| Sample 1-A | 3149 | 3825 | 5287 |
| Sample 1-B | 3126 | 3951 | 5409 |
| Carbonated Sample 1-B | 3564 | 4436 | 6122 |

Example 2: Different Sources of OPC

Additionally, three test groups of specimens were made using OPC with brand name B (OPC B). The compositions of the three specimens in Example 2 are identical to the compositions discussed in Example 1 with the exception of replacing OPC A with OPC B. For example, Sample 2-A, had the same relative portions of water, sand, and OPC as Sample 1-A, but the OPC was derived from a different manufacturer. Also, Sample 2-B had an added 1% portion of slaked lime to the composition from Sample 2-A. The relative strengths of the three specimens with OPC B are shown in Table 3. Once again, the addition of 1% of slaked lime to the concrete mixture led to a slight increase (5.4% at 28 days) in the compressive strength of the concrete. However, the further addition of $CO_2$ to the concrete specimen with 1% slaked lime led to 7.6%, 17.6%, and 19.3% increases in compressive strength at 3, 7, and 28 days, respectively, over the non-carbonated sample. Once again, $CO_2$ addition can significantly enhance the strength of the concrete, which does not diminish with time.

TABLE 3

Compressive Strength of Concrete using OPC B

| Age | 3 days Strength (psi) | 7 days Strength (psi) | 28 days Strength (psi) |
| --- | --- | --- | --- |
| Sample 2-A | 4060 | 4952 | 6250 |
| Sample 2-B | 4007 | 5221 | 6590 |
| Carbonated Sample 2-B | 4370 | 5825 | 7455 |

Example 3: Carbonation of Samples with Fly Ash

Two samples were prepared to determine the effect of carbonation on samples that had fly ash as a partial replacement for OPC in concrete manufacturing. The first sample, named Sample 3, replaces 20% of OPC B with an equivalent portion of class C fly ash. In contrast to the carbonation processes in Examples 1 and 2, the fly ash material can be first carbonated alone while suspended in mixing water by bubbling in $CO_2$. The strength testing results are given in Table 4. Once again, the carbonated sample displays a 13%, 4.5%, and 16% increase in compressive strength at 3, 7, and 56 days, respectively. The addition of $CO_2$ to concrete manufacturing processes that have fly ash as a partial replacement for OPC can result in a stronger concrete material over time.

TABLE 4

Compressive strength of concrete using OPC B replaced by 20% class C fly ash

| Age | 3 days Strength (psi) | 7 days Strength (psi) | 56 days Strength (psi) |
|---|---|---|---|
| Sample 3 | 3345 | 4145 | 6307 |
| Carbonated Sample 3 | 3801 | 4331 | 7320 |

Example 4: Carbonation of Samples with Metakaolin

Two samples were prepared to determine the effect of carbonation on samples that had metakaolin as a partial replacement for OPC in concrete manufacturing. The first sample, named Sample 4, replaces 20% of OPC B with an equivalent portion of metakaolin. The carbonated sample, Pre-Carbonated Sample 4, had the same mix design as Sample 4, but the metakaolin was replaced with pre-carbonated metakaolin. Since calcium content is very low in metakaolin, 1% (based off the original OPC mass) slaked lime slurry was first carbonated and then mixed with Pre-Carbonated Sample 4, which had metakaolin, OPC, and other ingredients, prior to casting. The compressive strength of these two samples at different ages are compared in Table 5. The addition of pre-carbonated metakaolin to concrete manufacturing processes can result in a stronger concrete material over time.

TABLE 5

Compressive strength of concrete using OPC B replaced by 20% metakaolin

| Age | 3 days Strength (psi) | 7 days Strength (psi) | 56 days Strength (psi) |
|---|---|---|---|
| Sample 4 | 3153 | 5194 | 6776 |
| Pre-Carbonated Sample 4 | 3685 | 6034 | 7496 |

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A method for manufacturing concrete comprising:
    (a) contacting a first slurry comprising a calcium-rich cementitious material in water with a carbon dioxide-rich gas to form a second slurry; and
    (b) adding ordinary Portland cement to the second slurry without reducing the amount of water present in the second slurry from step (a),
    wherein the concrete comprises calcite nanoparticles produced in situ and exhibits an increase in compressive strength of at least 10% compared to an identical concrete formed without the carbon dioxide-rich gas.

2. The method of claim 1, further comprising adding aggregates and admixtures of cementitious materials to the second slurry.

3. The method of claim 1, further comprising blending the second slurry.

4. The method of claim 1, wherein the calcium-rich cementitious material is chosen from slaked lime, fly ash, metakaolin, cement kiln dust, blended ordinary Portland cement-based cements, ground granulated blast-furnace slag, limestone fines, and any combination thereof.

5. The method of claim 1, wherein the carbon dioxide-rich gas is added by bubbling the carbon dioxide-rich gas into the first slurry.

6. The method of claim 1, wherein the carbon dioxide-rich gas is from a post-combustion flue gas.

7. The method of claim 1, wherein the carbon dioxide-rich gas is a byproduct of the manufacture of cement.

8. A method for manufacturing concrete comprising:
    (a) contacting a neat calcium-rich cementitious material with a carbon dioxide-rich gas to form a carbonated powder;
    (b) adding water to the carbonated powder to form a slurry; and
    (c) adding ordinary Portland cement to the slurry, without reducing the amount of water present in the slurry from step (b),
    wherein the concrete comprises calcite nanoparticles produced in situ and exhibits an increase in compressive strength of at least 10% compared to an identical concrete formed without the carbon dioxide-rich gas.

9. The method of claim 8, further comprising adding aggregates and admixtures of cementitious materials to the slurry.

10. The method of claim 8, further comprising blending the slurry.

11. The method of claim 8, wherein the calcium-rich cementitious material is chosen from slaked lime, fly ash, metakaolin, cement kiln dust, blended ordinary Portland cement-based cements, ground granulated blast-furnace slag, limestone fines, and any combination thereof.

12. The method of claim 8, wherein the carbon dioxide-rich gas is added by bubbling the carbon dioxide-rich gas into the slurry.

13. The method of claim 8, wherein the carbon dioxide-rich gas is from a post-combustion flue gas.

14. The method of claim 8, wherein the carbon dioxide-rich gas is a byproduct of the manufacture of cement.

15. The method of claim 1, wherein the calcium-rich cementitious material is present in an amount of from 1% to 20% by weight, based on the weight of ordinary Portland cement.

16. The method of claim 1, wherein the calcium-rich cementitious material is slaked lime present in an amount of 1% by weight, based on the weight of ordinary Portland cement.

* * * * *